United States Patent
Deliwala

(10) Patent No.: US 9,435,641 B2
(45) Date of Patent: *Sep. 6, 2016

(54) OPTICAL ANGLE MEASUREMENT

(71) Applicant: Analog Devices, Inc., Norwood, MA (US)

(72) Inventor: Shrenik Deliwala, Andover, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 85 days.

This patent is subject to a terminal disclaimer.

(21) Appl. No.: 13/924,797

(22) Filed: Jun. 24, 2013

(65) Prior Publication Data

US 2014/0375985 A1   Dec. 25, 2014

Related U.S. Application Data

(60) Provisional application No. 61/837,467, filed on Jun. 20, 2013.

(51) Int. Cl.
   G01B 11/26   (2006.01)

(52) U.S. Cl.
   CPC .................................. G01B 11/26 (2013.01)

(58) Field of Classification Search
   CPC ..... G01B 11/26; G01B 11/272; G01B 11/27; G01C 15/004; G01C 15/002
   USPC ........................................................ 356/138
   See application file for complete search history.

(56) References Cited

U.S. PATENT DOCUMENTS

| | | | |
|---|---|---|---|
| 3,701,043 A * | 10/1972 | Zuleeg et al. ............... | 372/50.1 |
| 5,602,384 A | 2/1997 | Nunogaki et al. | |
| 6,522,395 B1 | 2/2003 | Bamji et al. | |
| 8,581,307 B1 * | 11/2013 | Chen et al. .................... | 257/231 |
| 2002/0028045 A1 * | 3/2002 | Yoshimura et al. ............ | 385/50 |
| 2002/0109149 A1 * | 8/2002 | Chang .............................. | 257/98 |
| 2003/0159512 A1 * | 8/2003 | Zarabadi et al. .......... | 73/514.12 |
| 2004/0235149 A1 * | 11/2004 | Barlocchi et al. .......... | 435/287.2 |
| 2005/0176219 A1 * | 8/2005 | Kim et al. ..................... | 438/479 |
| 2006/0221250 A1 | 10/2006 | Rossbach et al. | |
| 2008/0217623 A1 * | 9/2008 | Hara et al. ....................... | 257/66 |
| 2010/0148087 A1 * | 6/2010 | Doering et al. .......... | 250/396 R |
| 2010/0301728 A1 * | 12/2010 | Helbing et al. ................. | 313/46 |
| 2011/0170105 A1 * | 7/2011 | Cui et al. ....................... | 356/450 |
| 2011/0228653 A1 * | 9/2011 | Shimazawa et al. ...... | 369/13.32 |
| 2011/0254086 A1 * | 10/2011 | Hsieh ............................. | 257/330 |
| 2012/0019907 A1 * | 1/2012 | Argoul et al. ................ | 359/371 |
| 2012/0025340 A1 * | 2/2012 | Park ............................. | 257/443 |
| 2012/0105823 A1 | 5/2012 | Hardegger et al. | |
| 2013/0037700 A1 * | 2/2013 | Michiyama et al. ...... | 250/208.2 |
| 2014/0306099 A1 * | 10/2014 | Oguchi et al. ................ | 250/225 |

* cited by examiner

*Primary Examiner* — Tarifur Chowdhury
*Assistant Examiner* — MD Rahman
(74) *Attorney, Agent, or Firm* — Patent Capital Group

(57) ABSTRACT

An optical detector may include an epitaxial layer having a continuous surface provided on a surface of a substrate. Two or more electrodes may be arranged at different positions in the epitaxial layer so that the electron-hole pairs generated in the epitaxial layer from incident light passing through the aperture and reaching the epitaxial layer have a varying probability of being collected by each of the electrodes as the angle of the incident light changes. The electrodes may be arranged at different depths in the epitaxial layer. The epitaxial layer may be continuous and have a continuous aperture-facing surface between each of the electrodes associated with a particular aperture to ensure that more light passing through the aperture is absorbable in the epitaxial layer and subsequently detectable by the electrodes. This may result in improved light detection capabilities.

48 Claims, 8 Drawing Sheets

300

500

600

OPTICAL ANGLE MEASUREMENT

RELATED APPLICATIONS

This application claims priority to provisional U.S. Patent Application Ser. No. 61/837,467, filed on Jun. 20, 2013, the content of which is incorporated herein in its entirety.

BACKGROUND

Optical sensing technology has been used to locate and track movement of objects in multiple dimensions. Traditional optical position sensitive detectors use optical lenses to focus incident light on a particular area of the detector to determine an angular location of an object emitting or reflecting the light. The lenses focus and map light rays emitting from the object to a particular location on the surface of the sensor. The angular location of the object emitting the light may be calculated from the mapped location of the light rays at the sensor and the properties of the lens. While lenses were needed to focus the light on a particular area of the detector in order to measure the properties of the light emitted from a light source, the use of lenses in these detectors has several limitations.

First, optical lenses are required to be positioned at a height at least equal to the focal length of the lens above the light detecting surface. This required separation between the lens and the light detecting surface consumes extra space in electronic devices, which makes it difficult to reduce the size of the device. Second, the lenses also represent a cost component of a detector. Eliminating the lens from these detectors would therefore reduce the height of the detectors and make them less costly to manufacture.

Existing lens-less detector solutions used two or more photodetectors isolated from each other by a trench between them. The trench was aligned with an aperture so that the quantity of incident light reaching each of the photodetectors after passing through the aperture would change as the angle of the incident light on the aperture changed. However, the trench reduced the light collection efficiency of these photodetectors because the light passing through the aperture that reaches the trench would not be detected by the photodetectors. In micromechanical devices, the trench may be several microns wide and may reduce the light collection efficiency of the photodetectors by 10% to 50% depending on the slit width. Additionally, trenches have been difficult to manufacture on germanium based epitaxial layers, which provide improved light detection capabilities over silicon based epitaxial layers.

Accordingly, there is a need for trenchless optical detectors generating an output used to calculate angular information about a light source.

DETAILED DESCRIPTION

Figure 1:
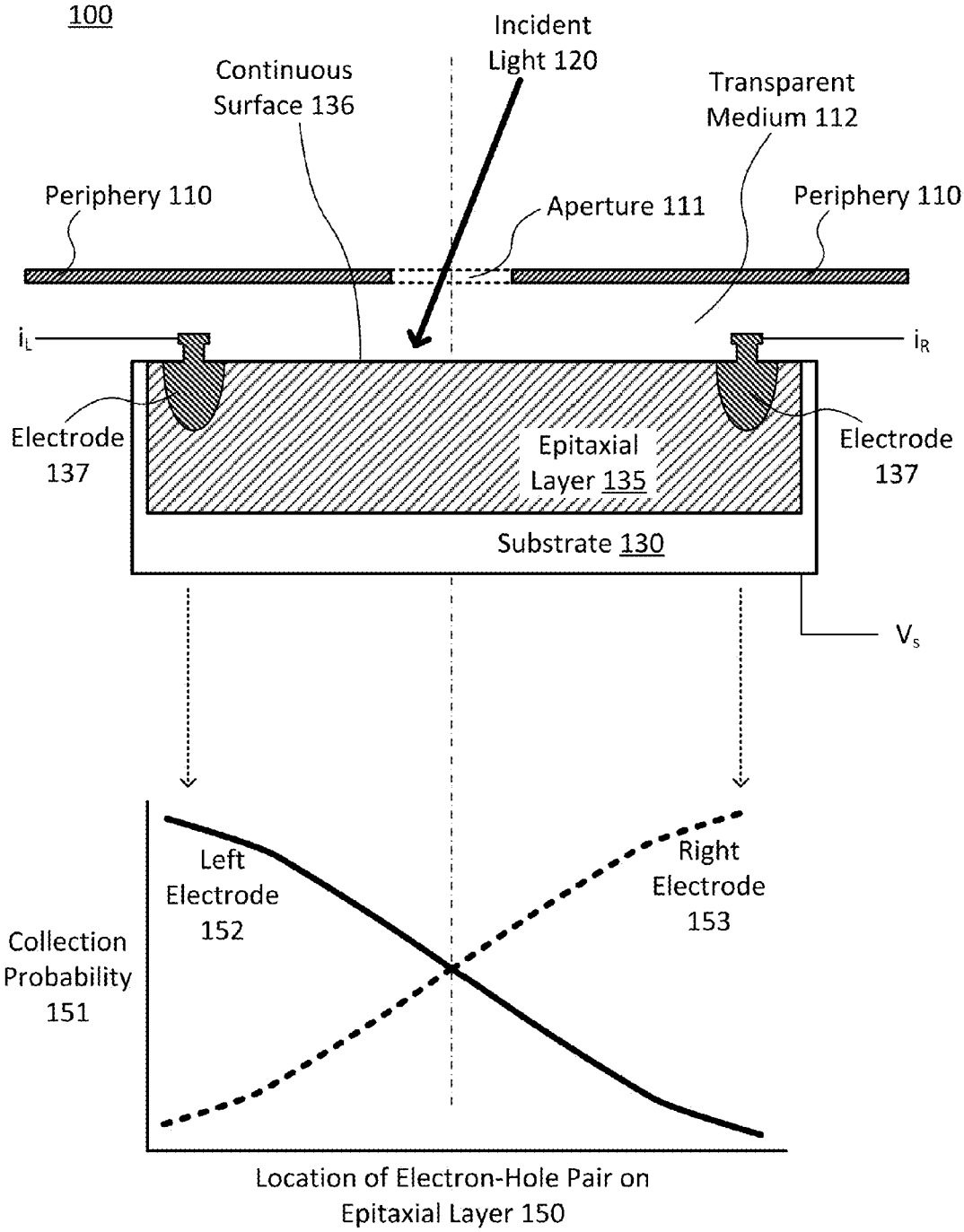
FIG. 1 shows a first exemplary optical detector.

In different embodiments, an epitaxial layer may be provided on a surface of a substrate. The epitaxial layer may be covered by a periphery surface of the optical detector. The periphery surface may include an aperture for incident light to pass through and reach the epitaxial layer. Two or more electrodes may be arranged at different positions in the epitaxial layer from the aperture so that the electron-hole pairs generated in the epitaxial layer from the incident light passing through the aperture and reaching the epitaxial layer have a varying probability of being collected by each of the electrodes as the angle of the incident light changes. The electrodes may be arranged at different depths in the epitaxial layer. In some instances, the electrodes may only partially penetrate a surface of epitaxial layer opposite that contacting the substrate. In other instances one or more of the electrodes may be positioned further into the epitaxial layer and wholly contained on all sides by the epitaxial layer.

The specific probability for each electrode may depend on the location of the electrode as compared to the location of the other electrodes and the location of the generated electron-hole pair in the epitaxial layer caused by the portion of the incident light reaching the epitaxial layer. The specific probability may also depend on a bias voltage applied to the substrate, the resistivity of the epitaxial layer, the thickness of the epitaxial layer, the distance between the aperture and the epitaxial layer, and the type and thickness of a filler, if any, between the periphery and the epitaxial layer.

The epitaxial layer may be continuous and have a continuous aperture-facing surface between each of the electrodes associated with a particular aperture. The epitaxial layer surface may be continuous when it does not contain trenches or other electrical isolators that impede the absorption of the incident light in the epitaxial layer resulting in the generation of electron-hole pairs in the epitaxial layer. As a result of not including the isolators, light passing through the aperture is absorbable and subsequently detectable at any and all parts of the continuous surface of the epitaxial layer encompassing the electrodes associated with that aperture. This results in improved light detection capabilities by the electrodes inserted in the epitaxial layer, as the continuous surface eliminates any dead zones in the epitaxial layer associated with the trenches in the prior art.

Additionally, the continuous surface of the epitaxial layer enables smaller sized apertures that provide higher angular resolution of the angle of the incident light. Smaller sized apertures are enabled because although the smaller apertures allow less light to reach the epitaxial layer, less light is needed due to the improved light detection capabilities of continuous surface epitaxial layer.

The light detection capabilities of these optical detectors with continuous surface epitaxial layers may be further improved by including one or more lenses or replacing the aperture with a lens. If the light absorption depth of the epitaxial layer is shallow for a wavelength of the incident light, then the lens may be configured to focus the incident light at or near the surface of the epitaxial layer. However, if the wavelength of the incident light has a deeper absorption depth then the lens may be configured to focus the incident light at a different depth in the epitaxial layer.

Continuous surface epitaxial layers may also be easier to manufacture than epitaxial layers with trenches or other isolators subdividing the layer. Certain types of epitaxial layers, such as germanium-based layers, including but not limited to germanium or germanium-silicon layers, may be easily created to have a continuous surface. It may be commercially impractical based on cost or resource limitations to subdivide these types of epitaxial layers into electrically isolated regions using trenches or other isolators. Additionally, any trenches used to isolate photodetectors also reduce the surface area of epitaxial layer available to absorb and detect incident light. This reduced surface area reduces the detection efficiency of the optical detector for a photodetectors of a particular size.

FIG. 1 shows an exemplary optical detector 100. The optical detector 100 may include a periphery 110 such as an exterior surface or housing. In those instances where the optical detector 100 is formed from a semiconductor, the periphery 110 may be an outer surface of the semiconductor. In those instances where the optical detector 100 is formed as an integrated circuit, the periphery 110 may be an exterior surface of the integrated circuit. The periphery 110 may be metallic or made from another substance impervious to light. In some instances the periphery 110 may be embedded in or part of a dielectric material such as glass or other material commonly used in semiconductor manufacturing. The periphery 110 may have an aperture 111 that allow incident light 120 to pass through the aperture 111. The aperture 111 may be any type of opening in or section of the periphery 110 that is transparent. In some instances, the aperture 111 may be a physical opening or hole in the periphery 110. In other instances, the aperture 111 may be section of the periphery 110 that is altered to make it transparent or permeable to light without necessarily creating a physical opening or hole. Such an altering may occur in some instances by removing an opaque coating covering a section of the periphery 110 to make it transparent, replacing a section of the periphery 110 with a transparent material, or by other techniques. The aperture 111 may be a slit or pinhole, or it may have any other shape or form.

One or more edges of aperture 111 may be beveled. In some instance, each edge of the aperture directed away from the epitaxial layer 135 may be beveled to reduce an amount of incident light that is reflected off the edge and redirected onto the epitaxial layer 135.

An interior of the optical detector 100 may include a substrate 130 having an epitaxial layer 135. The epitaxial layer 135 may be applied on a surface of the substrate 130 facing the aperture 110. The epitaxial layer 135 may, in some instances, be a germanium based, silicon based, or germanium and silicon based epitaxial layer. Other types of epitaxial layers may be used in other embodiments.

Two or more electrodes 137 may be situated at least partially in or on the epitaxial layer 135 so as to electrically contact the epitaxial layer. The contacting of the electrodes 137 to the epitaxial layer 135 may enable electrodes 137 to collect electron-hole pairs in the epitaxial layer 135 generated from the absorption of the incident light 120 in the epitaxial layer 135 to detect a quantity of the light received at the epitaxial layer 135. The depths that the electrodes 137 are positioned in the epitaxial layer 135 may be selected to correspond to an expected penetration depth of a wavelength of the incident light 120 to be detected to maximize the collection of electron-hole pairs by the electrode at that penetration depth.

The electrodes 137 may have any shape. For example, in some instances the electrodes may be discrete, point shaped electrodes. In other instances the electrodes may be continuous electrodes having a length or other dimension corresponding to that of the aperture 111, such a length corresponding to a slit length of a slit aperture or a rectangular shape corresponding to a rectangularly shaped slit aperture.

The two or more electrodes 137 may be located at predetermined positions relative to the aperture 111. For example, in some instances, such as that shown in FIG. 1, the electrodes 137 may be located at equal distances from a center of the aperture 111. In other instances, one or more of the electrodes 137 may be located at different distances than other electrodes 137 from the center of the aperture 111. Electrodes 137 may also be located opposite from each other relative to the center of the aperture 111 in some instances, but in other instances, the electrodes 137 may be positioned in different orientations.

The epitaxial layer 135 may also be continuous and have a continuous surface 136 between each of the electrodes. This continuity ensures that the entire section of the epitaxial layer located between the electrodes 137 is available to absorb light and generate electron-hole pairs. In the past, the presence of trenches and other isolators compartmentalizing the epitaxial layer 135 prevented maximum absorption of incident light reaching the epitaxial layer 135 and generation of electron-hole pairs collected by the electrodes.

In general, photodiodes may be formed from the electrodes 137 and substrate 130. If the substrate 130 is an n-type semiconductor then the substrate 130 may function as a common cathode contact while the two electrodes 137 may function as anodes forming p-type electrodes. In some instances the reverse may occur—the substrate 130 may be a p-type semiconductor anode and the electrodes 137 may be n-type cathodes. In some instances the light detection ability of the photodiode may be improved by decreasing the doping of the epitaxial layer 135 or making the epitaxial layer 135 similar to and/or of the same type as the common electrode substrate 130. This may ensure that the depletion layer surrounds the electrodes 137, effectively isolating the two electrodes from each other. The electrodes would be isolated from each other because the resistance $R_{eff}$ between the two electrodes 137 will be very large in the order of hundreds of mega ohms. The photodiodes may also be biased to measure the incident light in either photoconductive mode or photovoltaic mode.

In the photoconductive mode, the electrodes 137 may be electrically coupled to one or more current sensing devices that is able to identify a relative amount of collected electron-hole pairs at each electrode 137 that were generated in the epitaxial layer 135 by the absorption of the incident light 120 in the epitaxial layer 135. The graph 150-153 shown in FIG. 1 depicts a probability distribution function of a probability 151 that electron-hole pairs generated at different locations in the epitaxial layer 135 along the axis 150 will be collected by either the electrode 137 on the left side 152 of FIG. 1 (as indicated by the solid plot line) or the electrode 137 on the right side 153 of FIG. 1 (as indicated by the dashed plot line). Based on this known probability distribution, the measured currents at the respective left 152 and right 153 electrodes 137 ($i_L$ and $i_R$) may be compared to calculate an expected centroid of the incident light 120 between the electrodes 137. An angle of the incident light 120 may then be calculated based on the expected centroid. The probably distribution function may be determined experimentally. This approach of using the probability distribution function to calculate the angle of the incident light 120 may be accurate over only small separation distances between the electrodes 137 on the order of tens of microns rather than the several millimeters needed to build a traditional angle measuring photodiode detector. In instances where a millimeter scale photodetector is needed, several optical detectors 100 may be coupled together to achieve the millimeter scale.

An angle of the incident light 120 passing through the aperture 111 and reaching the epitaxial layer 135 may be calculated from the current measured at each of the electrodes 137. In the case of two electrodes 137 as shown in FIG. 1, the angle θ of the incident light 120 may be calculated from the left and right currents $i_L$ and $i_R$ as:

$$f(\theta) = \frac{i_L - i_R}{i_L + i_R} \quad (1)$$

The continuous nature of the epitaxial layer 135 between the electrodes 137 may cause in a resistance between each of the electrodes 137 equivalent to an effective resistor $R_{eff}$ between the electrodes. The actual size of $R_{eff}$ may vary depending on the distance between the electrodes, the number of electrodes, the resistivity of the epitaxial layer 135, the thickness of the epitaxial layer 135, and a bias voltage $V_S$ applied to the substrate. A voltage source applying bias voltage $V_S$ may be coupled to substrate and may apply the bias voltage to the epitaxial layer 135 to change a light detection sensitivity of the electrodes 137 by altering the amount of light required to be absorbed in the epitaxial layer 135 to generate an electron-hole pair. The optical detector 100 may be designed to have a large $R_{eff}$ to suppress noise between circuits connected to each of the electrodes and to reduce Johnson noise. $R_{eff}$ may be made large by creating a substantial depletion region in the epitaxial layer 135 around the electrodes 137. This may be accomplished using a slightly n-type high resistivity epitaxial layer 135 with p-type electrodes 137 to ensure a substantial depletion region around the electrodes. In other instances a p-type epitaxial layer 135 may be used with n-type electrodes 137.

In some instances, the aperture 111 and/or periphery 110 may be positioned directly on top of the epitaxial layer 135. In other instances, the epitaxial layer 135 may be separated from the aperture 111 and/or periphery 110 by a transparent medium 112. The transparent medium 112 may be a solid, liquid, or gas that is transparent and may include substances such as air, polymers, and glass. In some instances where the epitaxial layer 135 is separated from the aperture 111 and/or periphery 110, the periphery 110 and/or aperture 111 may be positioned at various heights above the epitaxial layer 135, including but not limited to heights less than 30 microns and/or heights less than 10 microns.

The optical detector 100 need not include any lens or other devices that focus light. Thus, the aperture 111 and medium 112 need not focus the incident light 120 passing through them. By not including any lenses or other light focusing devices, it is possible to reduce the size and manufacturing costs and manufacturing time of the optical detector 100. The light detection efficiency of the optical detector 100 may, in some instance, be improved by using one or more lens to focus light on or below the continuous surface 136 of the epitaxial layer 135. In some instances the aperture may be replaced with a lens.

Figure 2:
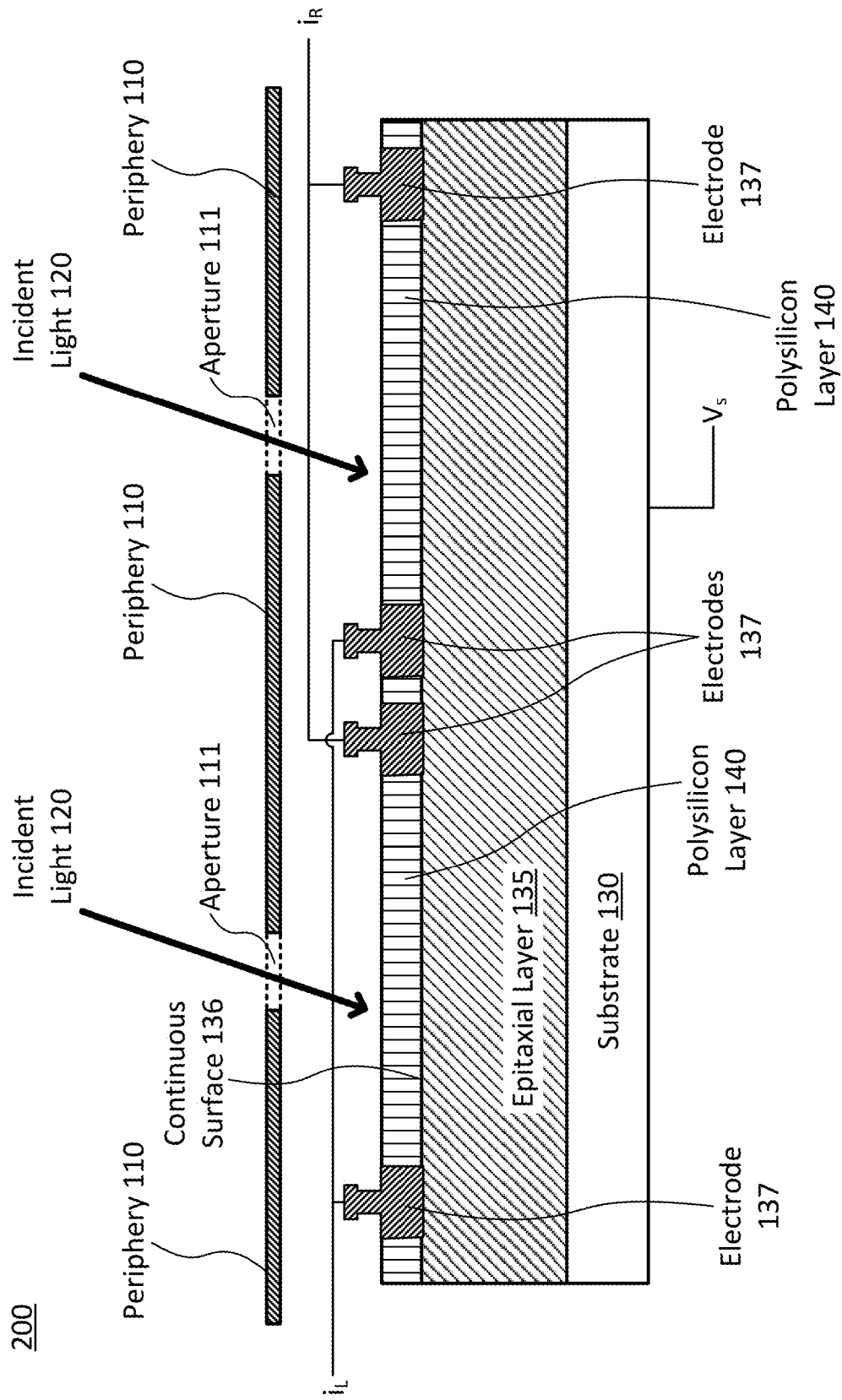
FIG. 2 shows a second exemplary optical detector.

FIG. 2 shows two apertures A and B and a set of electrodes A and B associated with each respective aperture A and B in an optical detector 200. The periphery 110 of optical detector 200 may contain two or more apertures 111 (only two of which are shown). Each aperture 111, such as apertures A and B 111 in FIG. 2 may have a set of two or more electrodes 137 associated with it, such as electrode set A associated with aperture A and electrode set B associated with aperture B. Each of the electrodes in a given electrode set may be located at a predetermined position of the epitaxial layer 135 with respect to its associated aperture so that the current in the electrode changes as the position of the incident light 120 passing through the respective aperture 111 and reaching the epitaxial layer 135 changes.

The electrodes 137 in each set may be positioned within the continuous surface area 136 of the epitaxial layer 135 that receives light 120 passing through the aperture 111 associated with the respective electrodes in each set. Each set of electrodes A and B 111 may be arranged in the epitaxial layer 135 to detect a respective quantity of the received light 120 passing through each respective aperture A and B 111.

In the example shown in FIG. 2, the electrodes are situated on the surface of the epitaxial layer 135 which is covered by a polysilicon layer 140 surrounding the electrodes 137. The polysilicon layer 140 may be transparent to some wavelengths of light but not others. Additionally, corresponding electrodes 137 in each set of electrodes A and B, such as the left electrode in each set and/or the right electrode in each set, may be coupled together to form an aggregated left and right current ($i_L$ and $i_R$) of each respective current generated at each corresponding electrode in each set.

Figure 3:
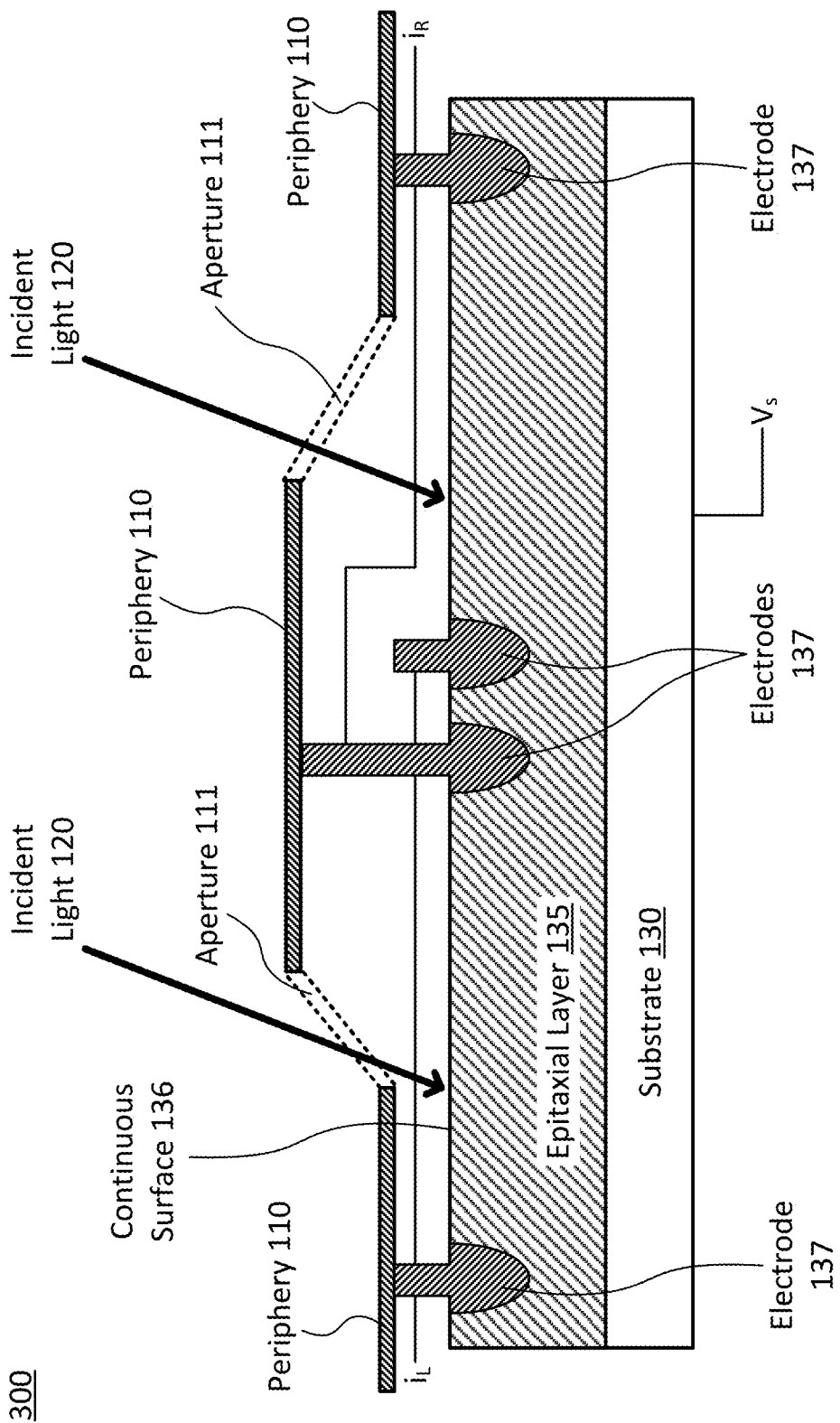
FIG. 3 shows a third exemplary optical detector.

FIG. 3 shows an optical detector 300 in which at least two sections of the periphery 110 are not co-planar with each other. In this example, the middle section of periphery 110 is elevated above that of the other two depicted sections of the periphery 110. By changing the height, orientation, and/or position of different sections of the periphery 110, it is possible to change the shape, size, angular position, and orientation of the apertures 111. This, in turn, may alter the amount, location, distribution of incident light 120 reaching the epitaxial layer 135.

Figure 4:
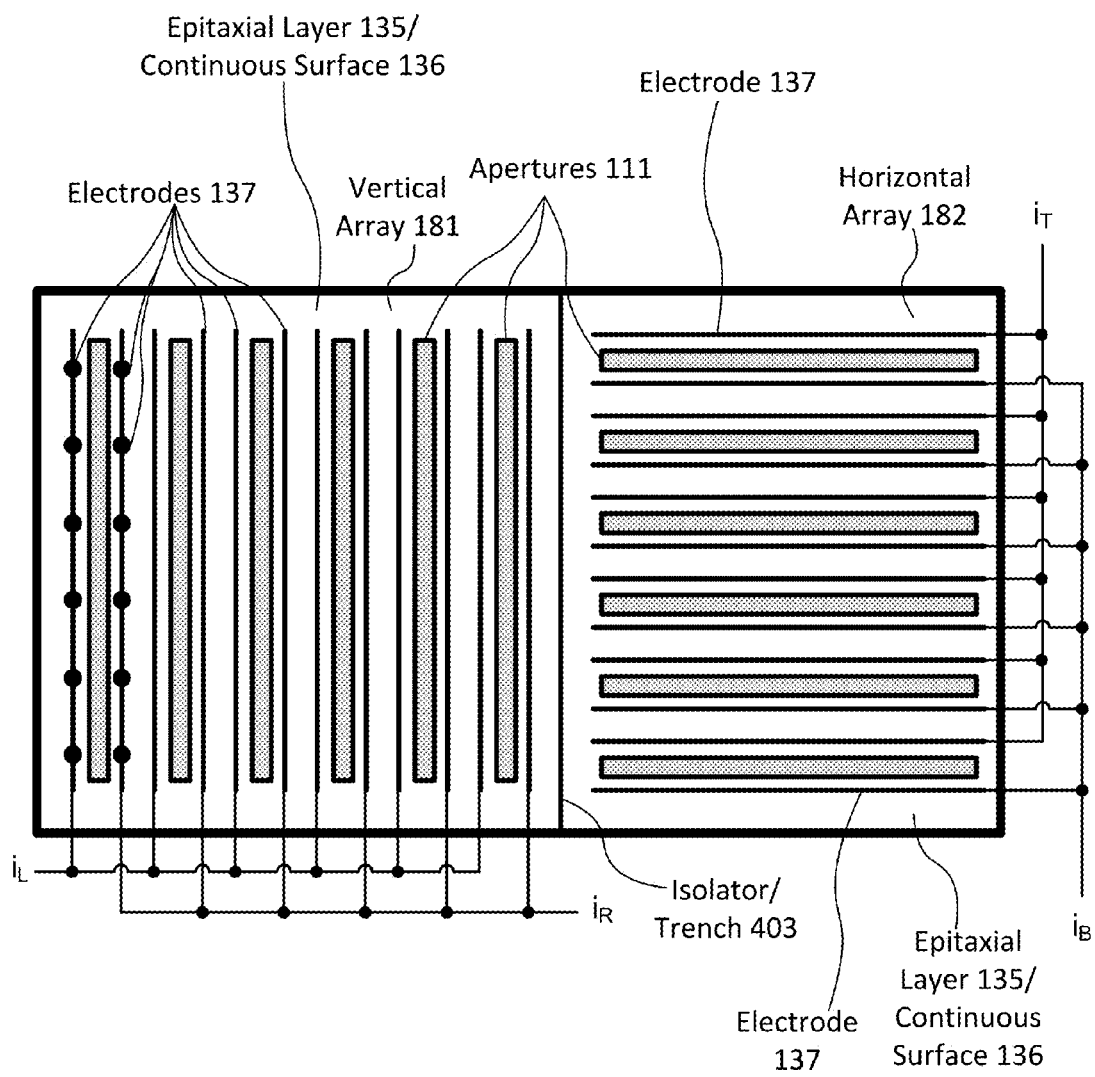
FIG. 4 shows a fourth exemplary optical detector.

FIG. 4 shows an embodiment of an optical detector 400 including both a vertical array 181 and a horizontal array 182 of slit apertures 111 and corresponding sets of electrodes 137. FIG. 4 shows six exemplary vertical slit apertures in the vertical array 181 and six exemplary horizontal slit apertures in the horizontal array 182. Each of the slit apertures 111 may have a set of one or more electrodes positioned parallel to the slit aperture 111 along a longitudinal direction of the slit aperture 111 on both sides of the slit aperture 111. The slit apertures 111 may also have beveled edges pointing away from the epitaxial layer 135 to minimize the likelihood that the incident light 120 will be reflected off the edge and redirected onto the epitaxial layer 135. Each electrode 137 may be arranged in the epitaxial layer 135 to detect a respective quantity of the incident light passing through each aperture.

Some of the electrodes 137 may be rectangularly shaped and extend longitudinally for at least a similar distance as the respective slit aperture 111 associated with the electrode 137. Some of the electrodes 137 may also be positioned parallel to its associated slit aperture 111, and in some instances, pairs of these electrodes 137 may be positioned at equal distances from and on either side of the associated slit aperture 111 as shown in FIG. 4. Each pair of these electrodes 137 may also be centered with a center of its corresponding slit aperture 111. In other instances, one or more electrodes or electrodes pairs may be offset from a center of its corresponding slit aperture 111.

In some instances, the electrodes 137 may include several point electrodes such as those shown parallel to both longitudinal sides of the left most aperture 111 in FIG. 4. The point electrodes may be positioned along two or more imaginary lines oriented parallel to the slit aperture. In the example shown in FIG. 4, the two imaginary lines are running vertically along both sides of the left most slit aperture 111. Respective point electrodes running along each imaginary line associated with a particular aperture may be electrically coupled together.

The vertical slit apertures 111 in the vertical array 181 may be arranged parallel to each other and perpendicular to the horizontal slit apertures 111 in the horizontal array 182. Different electrodes 137 associated with different apertures 111 may be coupled together provided that the orientation of the electrode 137 with respect to its corresponding aperture 111 is similar. For example, as shown in FIG. 4, all of the electrodes located on the left side of different apertures 111 may be electrically coupled to generate an aggregated left current $i_L$ and increase the light detection efficiency of the optical detector 400. Similarly, all the electrodes on the right side, top side, and bottom side of the apertures 111 may also be coupled together to generate aggregate right $i_R$, top $i_T$, and bottom $i_B$ currents and further increase the light detection efficiency.

In some instances, an electrical signal isolator 403 may be inserted or formed in the epitaxial layer 135 to subdivide the epitaxial layer 135 into multiple separate continuous surfaces 136. The isolator 403 may surround one or more electrodes 137 to isolate the ability of the electrodes 137 to collect only those electron-hole pairs that are generated within the isolated region surrounding the electrode 137. In some instances the isolator 403 may be used to compartmentalize the epitaxial layer 135 around each set of electrodes associated with each aperture 111 so that the quality of light reaching the epitaxial layer 135 that is detectable by a respective electrode 137 is isolated to only the incident light 120 that actually passes through the aperture 111 associated with the electrode 137. In the example shown in FIG. 4, the isolator 403 is a trench that subdivides the epitaxial layer 135 into two continuous sections, a first section encompasses the electrodes 137 in the vertical array 181 and a second section encompasses the electrodes 137 in the horizontal array 182.

An optical detector similar to that shown in FIG. 4 may include a periphery 110 having multiple slit apertures 111. At least two of the slit apertures 111 may be oriented orthogonally to each other. The optical detector may also include a substrate 130 having an epitaxial layer 135 receiving light 120 passing through each of the slit apertures 111. The optical detector may also include a set of electrodes 137 associated with each slit aperture 111. Each electrode 137 in each set may be arranged in the epitaxial layer 135 to detect a quantity of the received incident light 120 passing through the respective slit aperture 111. The epitaxial layer 135 may have a continuous surface 136 at least for each set of electrodes 137 that encompasses the electrodes 137 in each respective set of electrodes 137. In some instances the epitaxial layer 135 may have a single continuous surface 136 encompassing every electrode 137. The epitaxial layer 135 may be germanium based in some instances.

Figure 5:
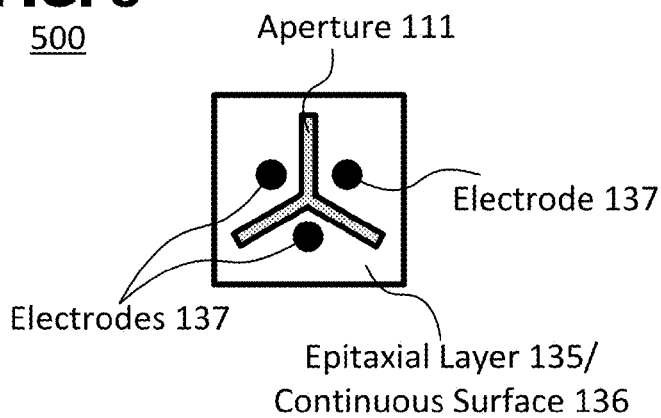
FIG. 5 shows a fifth exemplary optical detector.

FIG. 5 shows an exemplary optical detector 500 with an aperture 111 in the periphery 110 having multiple aperture segments and multiple electrodes 137 associated with the aperture 111 in the epitaxial layer 135 situated under the periphery 110. In the example shown in FIG. 5, the aperture 111 includes three aperture segments separated at equal angles of 120 degrees from each other. In some instances, the aperture 111 may include at least three aperture segments that are non-parallel and non-perpendicular to each other. Additionally, such an aperture 111 may also have at least three electrodes 137 associated with it. Each of the electrodes 137 may be positioned in the epitaxial layer 135 between different adjacent segments of the aperture 111. The epitaxial layer 135 may be continuous and have a continuous surface that is uninterrupted between each of these electrodes 137.

Figure 6:
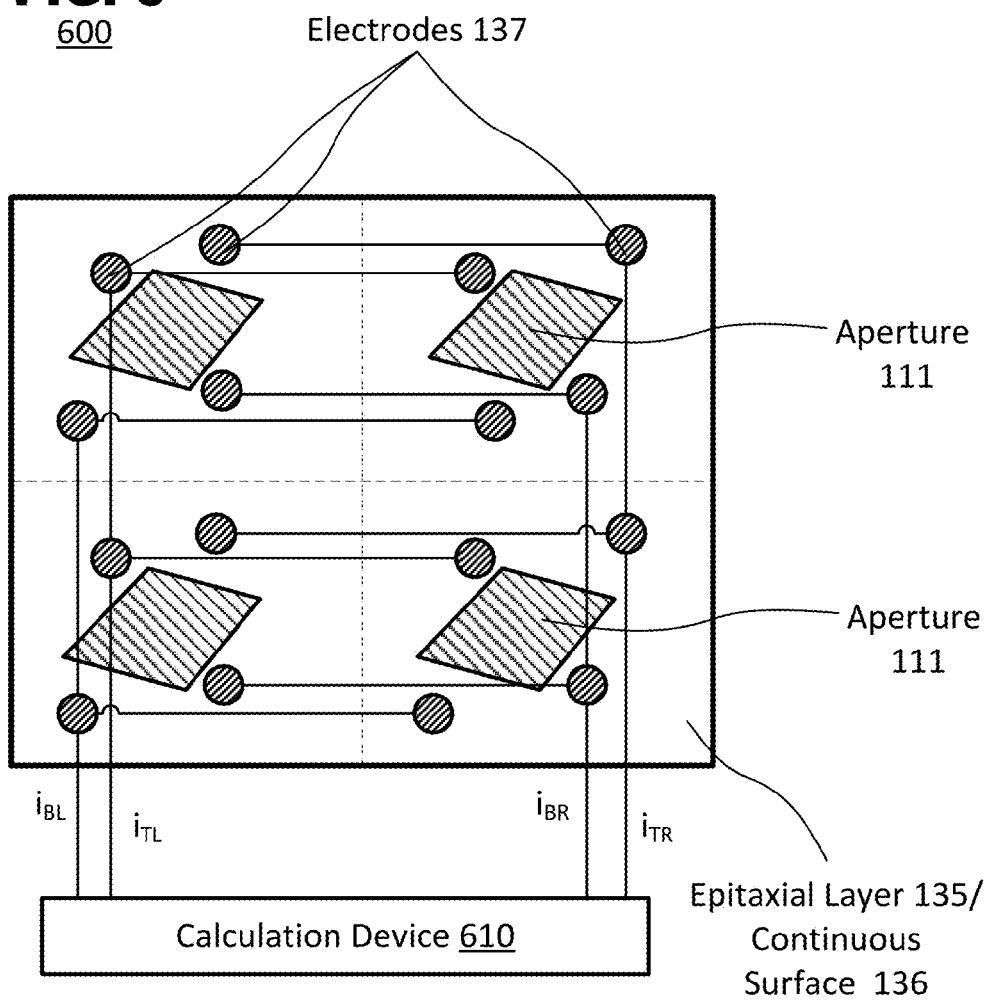
FIG. 6 shows a sixth exemplary optical detector.

FIG. 6 shows an exemplary optical detector 600 with multiple rhombus shaped apertures 111 and multiple electrodes 137 associated with each aperture 111. Each rhombus shaped aperture 111 in the periphery 110 may have four electrodes 137 associated with the aperture 111 in the epitaxial layer 135 situated under the periphery 110. Each of the electrodes 137 may be aligned with a respective side of the rhombus (or other shape if a different aperture shape is used in a different embodiment). In the example shown in FIG. 6, the each electrode 137 is associated with a different side (the top right, top left, bottom right, and bottom left sides) of the rhombus aperture 111. The electrodes 137 may also be situated at different distances from their respective sides of the aperture 111. Each of the electrodes associated with a same side of each rhombus aperture 111 may be electrically coupled together. Thus, as shown in FIG. 6, all the electrodes 137 associated with each of the four respective sides of the rhombus may be electrically coupled together. As a result of this coupling, the generated currents may be added together to form aggregate currents for the electrodes at the bottom left $i_{BL}$, top left $i_{TL}$, bottom right $i_{BL}$, and bottom right $i_{BR}$ sides.

The aggregated currents may be provided to a calculation device 610 in the optical detector 600. A calculation device 610 may include a processing device, such as a microcontroller, central processing unit, calculator, or other processor, that is configured to calculate positional information about the incident light 120 reaching the epitaxial layer 135. This positional information may include an angle of the incident light 120 passing through the aperture 111. The angle and/or other positional information may be calculated from the quantitative currents generated at the electrodes 137. This information about the quantitative currents generated at the electrodes 137 may either be provided to the calculation device 610 directly by coupling the electrodes 137 to the calculation device 610, such as shown in FIG. 6, or indirectly from another source. Thus, the calculation device 610 may calculate an angle of the light 120 passing through an aperture 111 from the respective quantities of light 120 detected at each of the electrodes 137 in the form current generated from the electron-hole pairs collected at the respective electrode 137. The epitaxial layer 135 may be continuous and have a continuous surface that is uninterrupted between each of the four or other number of electrodes 137 that are associated with a respective aperture 111.

Figure 7:
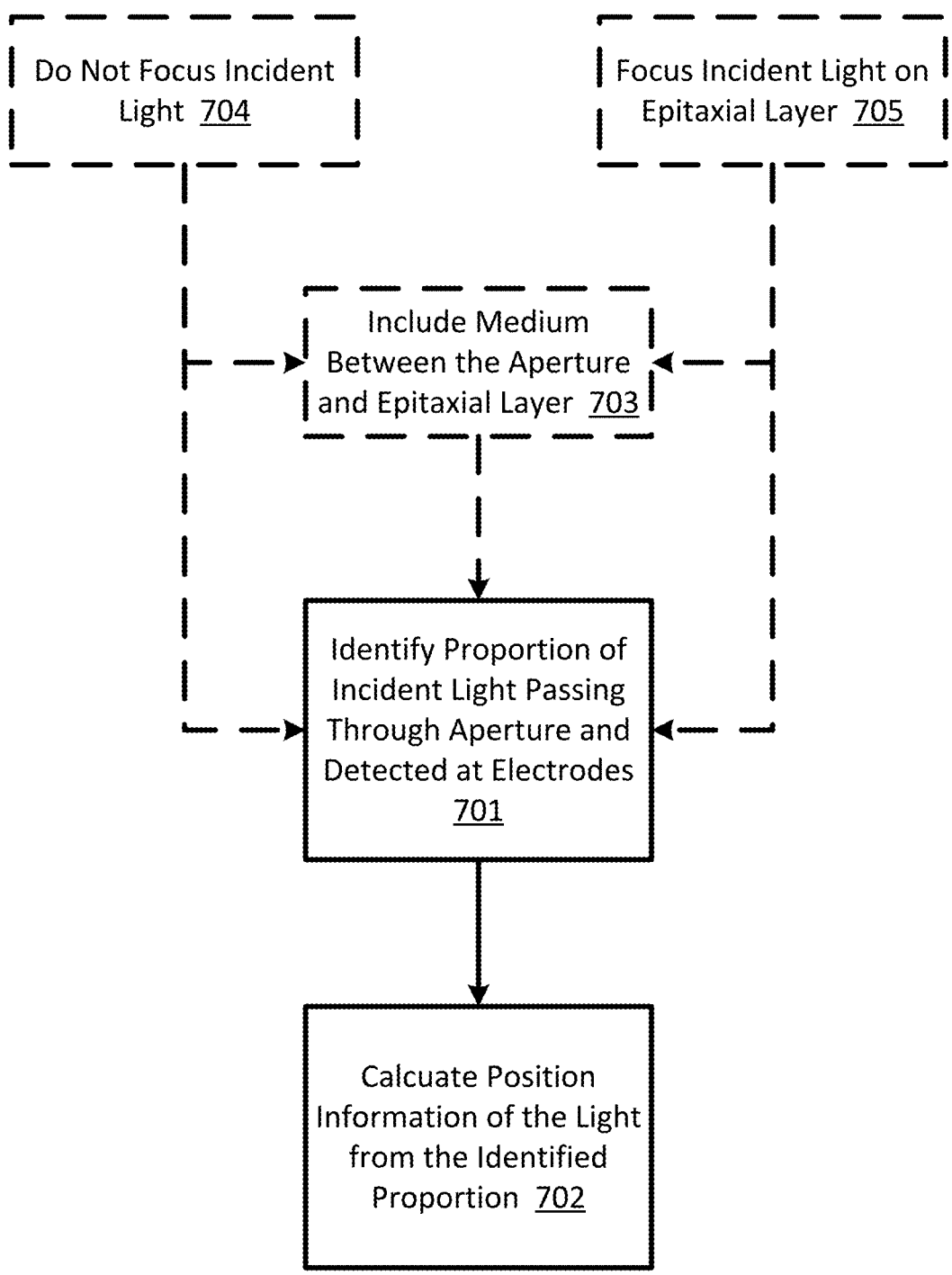
FIG. 7 shows exemplary methods.

FIG. 7 shows exemplary methods. In box 701, a proportion of incident light detected at two or more electrodes situated in an epitaxial layer having a continuous surface encompassing each of the electrodes may be identified after the incident light passes through an aperture in a periphery of an optical detector.

In box 702, positional information of the incident light may be calculated from the proportion of incident light detected at the plurality of electrodes and identified in box 701. In some instances, the calculated positional information may include an angle of the incident light. The calculated positional information may also include two or more calculated angles of the incident light in two or more dimensions. In some instances, the calculated positional information may include a directional change of the incident light based on a change in at least one of the angles.

In box 703, a transparent medium may be included between the aperture in the periphery of the optical detector and the epitaxial layer. The incident light may pass through the transparent medium before reaching the epitaxial layer. The transparent medium may be a glass, a polymer, or another solid, liquid, or gas.

In box 704, the incident light need not be focused, and the functions in boxes 701, 702, and 703 may be performed on the unfocused light passing through the aperture. The transparent medium and the aperture need not focus the light passing through the aperture in some instances. Accordingly, the transparent medium and aperture need not include a lens or other focusing apparatus in some instances. Thus, in some instances, the incident light need not be focused both as it passes through the aperture and after it passes through the aperture.

In box 705, the incident light may be focused on the epitaxial layer before identifying the proportion of the incident light in box 701. One or more lens, including a micro-lens array, or other focusing apparatus may be used to focus the light. The one or more lenses may focus the light on the surface of the epitaxial layer or at any predetermined depth beneath the surface of the epitaxial layer to maximize the electron-hole pair generation and overall light detection ability of the optical detector.

In some instances, the optical detectors described herein may be used to track the position of one or more objects. To perform this object tracking, in some instances a light source or an optical detector may be affixed to an object to be tracking. The other may affixed to a particular position or apparatus from which a distance to the object is to be measured. The light source may emit light that the optical detector is configured to detect. The light source and/or optical detector may be modulated, such as by using time, frequency, or phase modulation, so that the light emitted from the light source may be uniquely identified and/or differentiated from other sources of light detected at the optical detector. Light originating from multiple light sources may be uniquely identifiable by uniquely modulating each of the light sources. The optical detector may be configured to calculate an angular position of incident light from the light source on the optical sensor.

In some instances objects may also be tracked by determining an angular position of light from a light source that is reflected off an object and then detected at the optical detector. This reflection based approach may be used as an alternative or in addition to the approach described above in which one of the light source or the optical detector is affixed to the object to be tracked. The reflective approach may be used in some instances where it is impractical or otherwise undesirable to affix a light source or optical detector to an object that is to be tracked. For example, the reflective approach may be used in situations where the optical detector is installed on a motor vehicle to detect the presence of a pedestrian, other vehicle, or object in the path of the vehicle, as it is impractical to affix light sensors to every possible person, vehicle, and detectable object in this situation. On the other hand, if the optical detector is only used to detect the presence of a person or animal, then the reflective approach need not be used as the body heat emitted by each person or animal may function as an intrinsic light source that is to be detected by the optical detector.

Both of these approaches may also be used to perform other object tracking functions. For example, hand gestures and other body or object movements may be detected at the optical detector. These gestures may be used to control user interfaces, such as activating different computing applications, navigating to different pages or documents, or performing other functions. Light sources on wireless devices, such as remote controls or gaming console controllers, may also be tracked for gaming, menu navigation, precise identification of device location, and other purposes.

Figure 8:
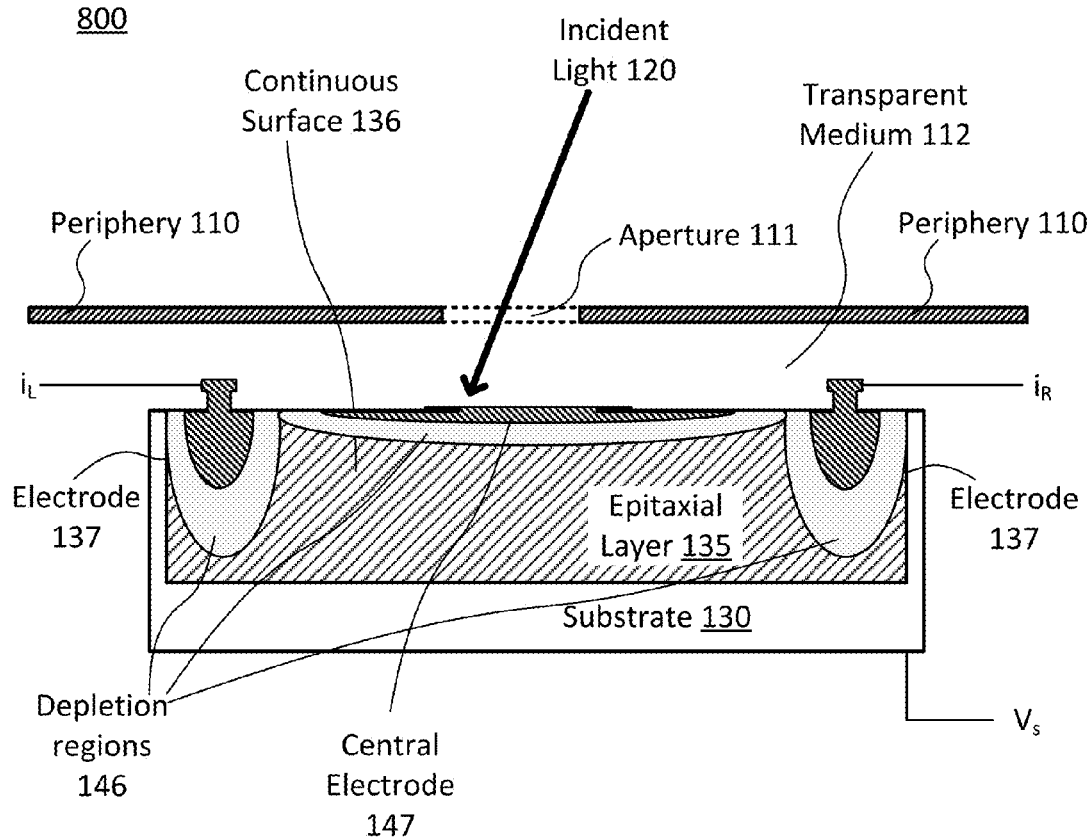
FIG. 8 shows a seventh exemplary optical detector.

FIG. 8 shows an optical detector 800 similar to that shown FIG. 1 but with an additional central electrode 147. The central electrode 147 may be a third electrode inserted between the existing electrodes 137 and aligned with the aperture 111 such that the incident light 120 passing through the aperture 111 strikes the central electrode 147. The central electrode 147 may be shallower than the other electrodes 137 and may be electrically isolated from the other electrodes 137 due to the depletion region 146 surrounding each of the electrodes 137 and 147. The thickness of each depletion region 146 may depend on the relative bias applied to each of the electrodes 137 and 147. For example, by increasing the bias on an electrode 137 or 147 relative to the other electrodes 137 and 147 may cause the depletion region 146 directly below the biased electrode 137 or 147 to extend deeper into the epitaxial layer 135. The electron-hole pairs collected by the incident light 120 may now have one of three electrodes (the left, right, and central electrodes 137 and 147) to associate with, and the probability of association with any particular one of these electrodes may depend on the distance to each of the electrodes as well as bias on each of the electrodes and the doping profiles of each of the electrodes. In many instances, most of the photogenerated carriers near the surface of the epitaxial layer 135 would likely be collected by central electrode 147 and not electrodes 137 since these electrodes 137 are shielded by the aperture 111. However, this is less likely to be the case for the carriers deeper in the epitaxial layer 135.

Figure 9:
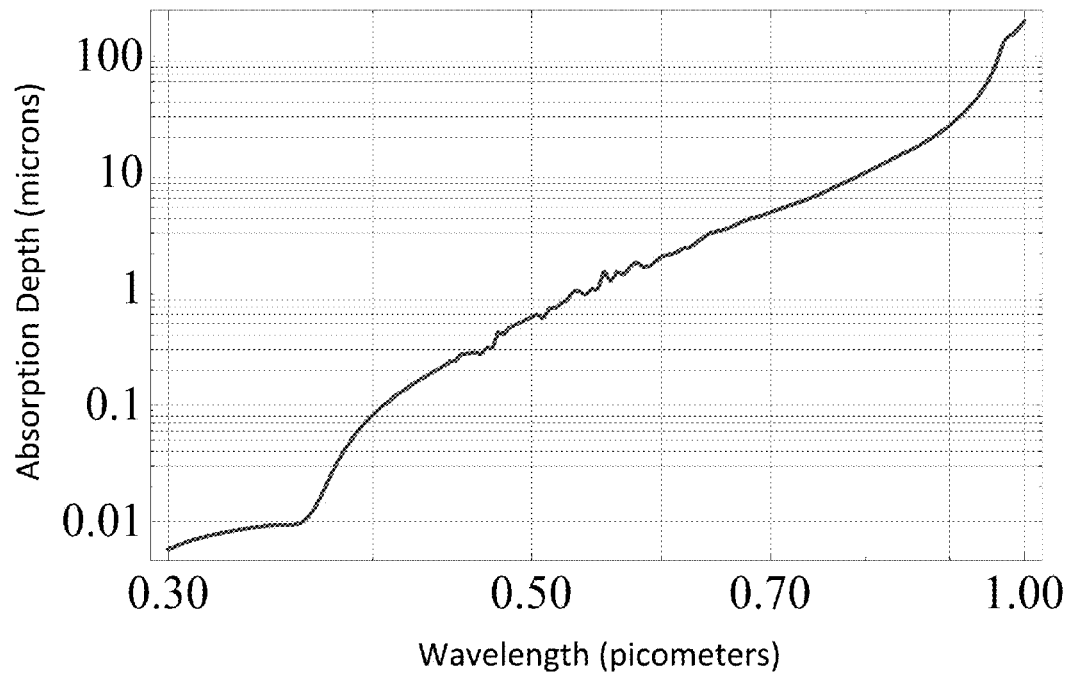
FIG. 9 shows an exemplary graph of light absorption depths at different wavelengths in a silicon substrate.

In many semiconductors, including indirect bandgap semiconductors such as silicon or germanium semiconductors, the absorption depth of incident light 120 is a function of the wavelength of the light 120. FIG. 9 shows an exemplary light absorption depth chart in silicon semiconductors for different wavelengths of the light. As shown in FIG. 9, much of the visible light spectrum from 350 nm to 700 nm is absorbed in a relatively shallow region of few microns. However, near infrared (NIR) light, such as that emitted from a remote controller LED at 850 nm or 940 nm is absorbed relatively deeply. Making the epitaxial layer 135 deep enough to collect a large fraction of this NIR light may result in electrodes 137 collecting a substantial fraction of the NIR light but practically none of visible light, which may be collected by the central electrode 147. Varying the bias of the electrodes 147 and 137 may in turn further change the probability that the different colors and wavelengths of light are collected by each of the electrodes 137 and 147.

The central electrode 147 may therefore be used to remove much of the visible light noise so that only the NIR light is detected at the electrodes 137 to improve the accuracy of the angular measurement function performed on the NIR light by electrodes 137. Thus central electrode 147 may perform a similar to an optical coating or filter blocking visible light from reaching the epitaxial layer 135.

Figure 10:
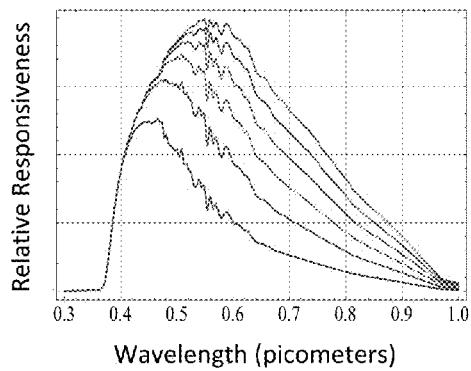
FIG. 10 shows an exemplary graph of a responsiveness of a central electrode to light at different wavelengths and bias conditions.
Figure 11:
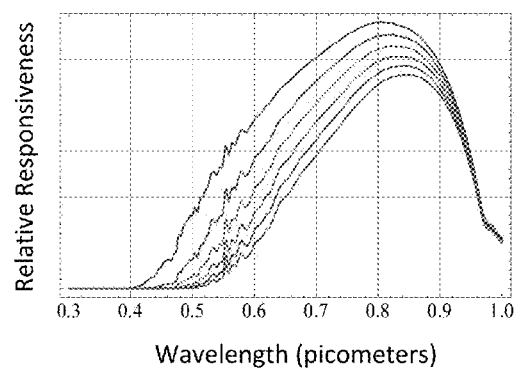
FIG. 11 shows an exemplary graph of a responsiveness of electrodes other than the central electrode to light at different wavelengths and bias conditions similar to that shown in FIG. 10.

In some instances, the relative amount of photocurrents generated at the central electrode 147 and electrodes 137 may be used to calculate an amount of ambient light, such as the light seen by a human eye. FIG. 10 shows the responsiveness of central electrode 147 to different colors of light at different bias conditions. FIG. 11 shows the similar responsiveness of the other electrodes 137 to the same colors of light at bias conditions similar to those in FIG. 10. The responsiveness information from these plots may in turn affect the probability of the photogenerated currents being collected by the different electrodes. Actual responsiveness plots may vary from those shown in FIGS. 10 and 11, depending on the characteristics of the optical detector including but not limited to the epitaxial layer 135 properties, dopants used, bias conditions, aperture size, and so on. Once a particular optical detector device is constructed, the responsiveness plots may be determined and fixed so that the detected light may be characterized by its type, blackbody temperature, and/or other spectral characteristics.

Data obtained from the optical detector may provide different types of information. For example, combining photocurrents from central electrode 147 and other electrodes 137 may provide information about visible ambient light, lux measurements, and other information about a light source, such as its color temperature. Central electrode 147 may also be configured to shield electrodes 137 from a receiving photocurrents generated by particular wavelengths of incident light, such as visible light, so that the electrodes 137 may be used to ascertain angular information about NIR light. The optical detector may also be configured to detect large and rapidly changing intensities of light at one or more different wavelengths in different ranges, including but not limited to the visible and NIR ranges.

Additionally, in some embodiments, spectrometric information about an object can be measured in addition to the spatial information described previously. For example, blood oxygen levels may be measured using two colors of light (there are many choices but wavelengths near 660 nm and 940 nm are often selected) to perform a spectrometry on the blood inside the body. A heart rate, photoplethysmograph (PPG), and other oximetry measurements may be obtained from light detected at the optical detector after passing through or being reflected off a blood flow in a person or animal.

PPG signals for pulse oximetry may be measured by calculating a DC signal level and a AC amplitude of the photocurrents from the detected light at each of two or more wavelengths $\lambda_1$ and $\lambda_2$ after passing through or being reflected off a blood flow in a person or animal. The following ratio may be used to measure saturated blood oxygen:

$$R = \frac{(I_{AC}/I_{DC})_{\lambda_1}}{(I_{AC}/I_{DC})_{\lambda_2}}$$

The connection between R and the actual blood oxygen may be based on simple physical theory or an empirically measured fit between R and blood oxygen levels. This medical information may be provided in an embodiment in conjunction with object tracking and/or spatial positioning functionality.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments and figures pertain to specific numbers, orientations, and positions of apertures and electrodes, but in other embodiments, different numbers, orientations, shapes, and positions of the apertures and/or electrodes may be used.

I claim:

1. An optical detector comprising:
   a periphery having an aperture;
   a substrate having a continuous epitaxial layer with a continuous surface receiving light passing through the aperture; and
   a plurality of electrodes, each contacting the epitaxial layer to detect a quantity of the received light;
   wherein one of the plurality of electrodes is: (a) positioned at a shallower depth in the epitaxial layer than other ones of the plurality of electrodes and (b) aligned with respect to the aperture to receive the light passing through the aperture.

2. The optical detector of claim 1, wherein the plurality of electrodes includes two electrodes positioned at equal distances from the aperture and opposite each other.

3. The optical detector of claim 1, wherein the aperture is a slit.

4. The optical detector of claim 3, wherein at least two of the electrodes are rectangularly shaped and positioned parallel to the slit aperture at equal distances from the slit aperture.

5. The optical detector of claim 3, wherein a plurality of the electrodes are point electrodes positioned along a plurality of imaginary lines oriented parallel to the slit aperture.

6. The optical detector of claim 3, further comprising:
   a plurality of slit apertures; and
   a pair of electrodes arranged side-by-side on either side of each slit aperture, each electrode detecting a change in its detected quantity of light as the angle of light incident to its respective slit aperture changes.

7. The optical detector of claim 6, wherein electrodes arranged on a same side of each slit aperture are coupled together to increase light detection efficiency.

8. The optical detector of claim 7, wherein each of the slit apertures have beveled edges pointing away from the epitaxial layer.

9. The optical detector of claim 7, wherein each pair of electrodes is centered with a center of its corresponding slit aperture.

10. The optical detector of claim 6, wherein at least one pair of electrodes is offset from a center of its corresponding slit aperture.

11. The optical detector of claim 1, wherein each edge of the aperture is beveled.

12. The optical detector of claim 11, wherein the beveled edges of the aperture are directed away from the epitaxial layer.

13. The optical detector of claim 1, wherein the aperture is a section of the periphery permeable to light.

14. The optical detector of claim 1, wherein the periphery is positioned at a height less than 30 microns above the epitaxial layer.

15. The optical detector of claim 1, wherein the periphery is positioned at a height less than 10 microns above the epitaxial layer.

16. The optical detector of claim 1, wherein the periphery is positioned directly on top of the epitaxial layer.

17. The optical detector of claim 1, wherein the periphery has a plurality of apertures, the continuous surface of the epitaxial layer receives light passing through each of the apertures, and the plurality of electrodes includes a set of electrodes for each of the plurality of apertures, each set of electrodes arranged in the epitaxial layer to detect a respective quantity of the received light passing through each respective aperture.

18. The optical detector of claim 17, wherein at least two of the apertures are slit apertures arranged perpendicular to each other in the optical detector.

19. The optical detector of claim 17, wherein at least two of the apertures are slit apertures arranged parallel to each other in the optical detector.

20. The optical detector of claim 1, wherein at least two sections of the periphery are not co-planar with each other.

21. The optical detector of claim 1, wherein the aperture includes at least three non-parallel and non-perpendicular aperture segments, and the plurality of electrodes includes at least three electrodes, each positioned between different adjacent segments of the aperture.

22. The optical detector of claim 1, wherein the aperture includes a rhombus aperture and the plurality of electrodes include at least four electrodes, each aligned with a respective side of the rhombus aperture.

23. The optical detector of claim 1, further comprising a calculation device calculating an angle of the light passing through the aperture from the respective quantities of light detected at each of the electrodes.

24. The optical detector of claim 1, further comprising a voltage source coupled to the substrate and applying a bias voltage to the epitaxial layer changing a light detection sensitivity of the electrodes.

25. The optical detector of claim 1, wherein the epitaxial layer is a germanium epitaxial layer.

26. The optical detector of claim 1, further comprising an isolator to isolate the quantity of light detected by each electrode to only the light passing through the aperture.

27. The optical detectors of claim 26, wherein the isolator is a trench encompassing the plurality of electrodes.

28. The optical detector of claim 1, further comprising a medium between the periphery and the epitaxial layer that does not focus light passing through it.

29. The optical detector of claim 28, wherein the medium is a glass or a polymer.

30. The optical detector of claim 1, wherein the one of the plurality of electrodes is a central electrode.

31. The optical detector of claim 1, wherein the one of the plurality of electrodes is positioned in the epitaxial layer at an absorption depth of visible light and the plurality of electrodes are positioned in the epitaxial layer at an absorption depth of near infrared light.

32. The optical detector of claim 1, further comprising a calculation device calculating a quantity of ambient light from photocurrents obtained from the plurality of electrodes.

33. The optical detector of claim 32, wherein the calculation device further calculates a characteristic of the received light from the photocurrents obtained from the plurality of electrodes.

34. The optical detector of claim 33, wherein the characteristic of the received light is a color temperature.

35. The optical detector of claim 1, further comprising a calculation device calculating a quantity of ambient light from photocurrents obtained from the plurality of electrodes and calculating an angle of the light passing through the aperture from the respective quantities of light detected at each of the plurality of electrodes.

36. An optical detector comprising:
a periphery having a plurality of slit apertures at least two of which are oriented orthogonally to each other;
a substrate having an epitaxial layer receiving light passing through each of the slit apertures; and
a set of electrodes associated with each slit aperture, each electrode in each set arranged in the epitaxial layer to detect a quantity of the received light passing through the respective slit aperture, wherein the epitaxial layer has a continuous surface at least for each set of electrodes that encompasses the electrodes in each respective set of electrodes;
wherein one of the set of electrodes is: (a) positioned at a shallower depth in the epitaxial layer than other electrodes of the set of electrodes and (b) aligned with respect to the slit aperture corresponding to the one of the set of electrodes to receive the light passing through the respective slit aperture.

37. The optical detector of claim 36, wherein the epitaxial layer has a single continuous surface encompassing every electrode.

38. The optical detector of claim 37, wherein the epitaxial layer is germanium based.

39. A method comprising:
identifying a proportion of incident light detected at a plurality of electrodes in an epitaxial layer having a continuous surface encompassing each of the electrodes after the incident light passes through an aperture; and
calculating positional information of the incident light from the identified proportion of incident light detected at the plurality of electrodes;
wherein one of the plurality of electrodes is: (a) positioned at a shallower depth in the epitaxial layer than other ones of the plurality of electrodes and (b) aligned with respect to the aperture to receive the light passing through the aperture.

40. The method of claim 39, wherein the calculated positional information includes an angle of the incident light.

41. The method of claim 39, wherein the calculated positional information includes a plurality of angles of the incident light in a plurality of dimensions.

42. The method of claim 41, wherein the calculated positional information includes a directional change of the incident light based on a change in at least one of the angles.

43. The method of claim 39, further comprising not focusing the incident light.

44. The method of claim 39, further comprising not focusing the incident light as it passes through the aperture and after it passes through the aperture.

45. The method of claim 39, further comprising including a medium between the aperture and the epitaxial layer through which the incident light passes before reaching the epitaxial layer.

46. The method of claim 45, wherein the medium and the aperture do not focus light passing through them.

47. The method of claim 46, wherein the medium is a glass or a polymer.

48. The method of claim 39, further comprising focusing the incident light on the epitaxial layer.

* * * * *